United States Patent [19]
Rogers

[11] Patent Number: 5,692,811
[45] Date of Patent: Dec. 2, 1997

[54] APPARATUS FOR CENTERING A WHEEL ON A HUB

[75] Inventor: Larry Keith Rogers, Henderson, Ky.

[73] Assignee: Accuride Corporation, Henderson, Ky.

[21] Appl. No.: 688,357

[22] Filed: Jul. 30, 1996

Related U.S. Application Data

[63] Continuation of Ser. No. 523,901, Sep. 6, 1995, abandoned, which is a continuation of Ser. No. 350,735, Dec. 7, 1994, abandoned, which is a continuation of Ser. No. 224,134, Apr. 6, 1994, abandoned, which is a continuation of Ser. No. 9,895, Jan. 27, 1993, abandoned.

[51] Int. Cl.$^6$ .................................................. B60B 27/06
[52] U.S. Cl. ............................... 301/105.1; 301/35.62
[58] Field of Search ........................... 301/1, 5.1, 6.1, 301/35.54, 35.62, 35.63, 63.1, 105.1, 111; 29/271, 273, 464; 403/13

[56] References Cited

U.S. PATENT DOCUMENTS

| | | | |
|---|---|---|---|
| 3,138,407 | 6/1964 | Duggan | 301/9.1 |
| 3,366,421 | 1/1968 | Bradley | 301/35.62 |
| 3,411,813 | 11/1968 | Kreuz | 403/13 X |
| 4,452,493 | 6/1984 | Liggett | 301/37.29 |
| 4,699,431 | 10/1987 | Daberkoe | 301/105.1 X |

*Primary Examiner*—Russell D. Stormer
*Attorney, Agent, or Firm*—Kilgannon & Steidl

[57] ABSTRACT

A centering apparatus for centering a detachable vehicular wheel with a central opening on a hub. The one-piece centering apparatus fits in an annular groove in the hub pilot boss. The one-piece centering apparatus may be in the shape of a ring, with bendable and resilient fingers extending outwardly from the ring at an angle away from the outer end of the pilot boss. As the wheel is mounted over the hub pilot boss, a flange at the wheel central opening presses against the fingers on the ring. This causes the fingers to bend slightly to compensate for any interference fit. The resilient action of the fingers keeps the wheel centered on the hub. The wheel is then bolted to the wheel assembly. In other embodiments, the centering apparatus has a cross-section in the approximate shape of a "V", "U", "N", or "M", one leg of which serves as the bendable and resilient finger. The fingers may be replaced by a continuous member extending around the circumference of the pilot boss. The centering apparatus may also be a coiled wire in the shape of a toroid. The centering apparatus alternatively can be retained in an annular groove in the margin of the wheel central opening, with the bendable resilient fingers extending inwardly to press fit with the hub pilot boss and center the wheel on the hub. Various materials may be used for the centering apparatus.

23 Claims, 4 Drawing Sheets

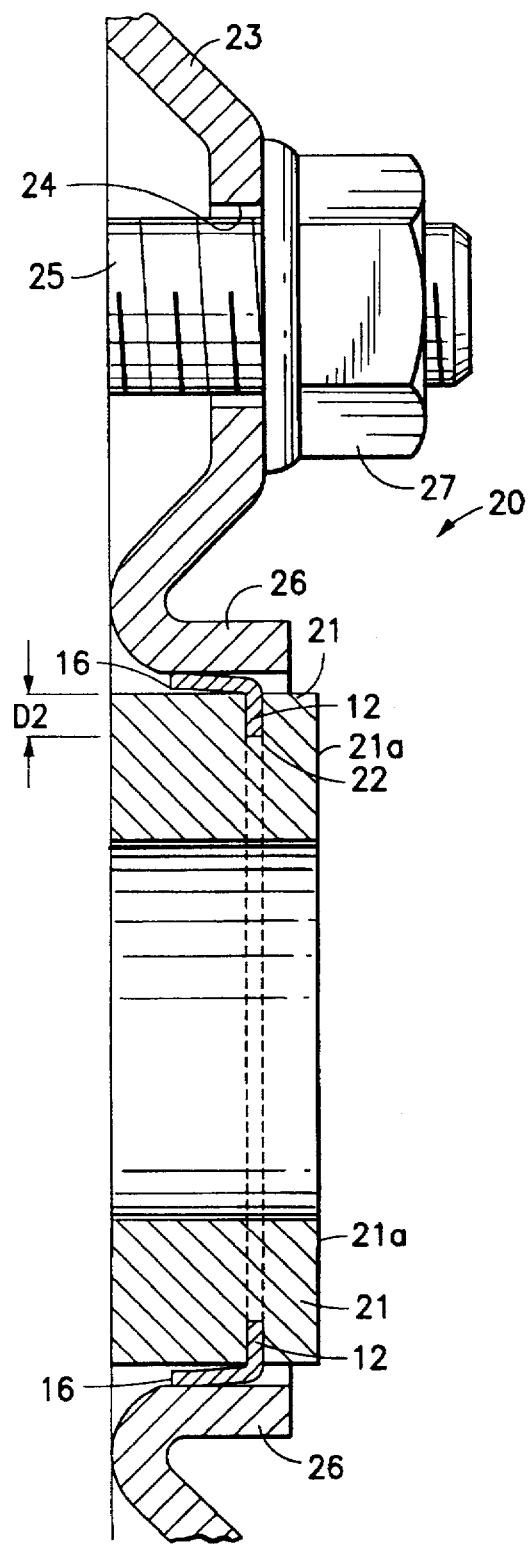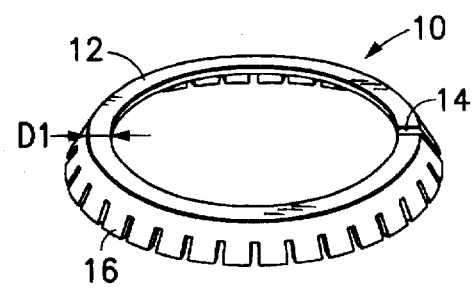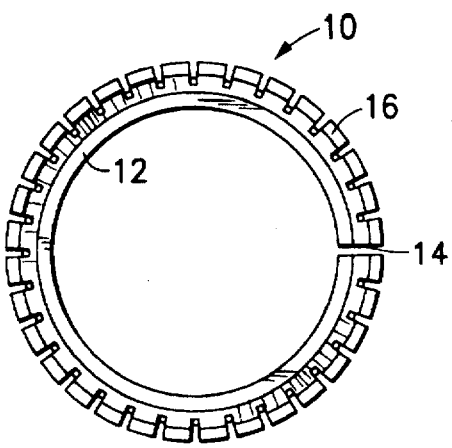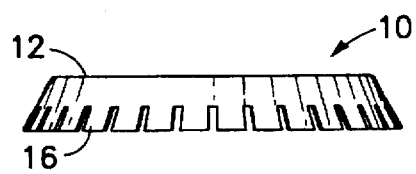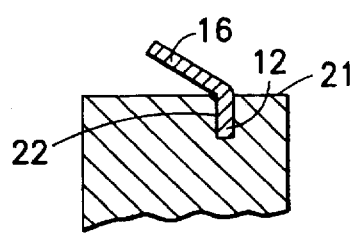
FIG. 1
FIG. 2
FIG. 3
FIG. 4
FIG. 4A

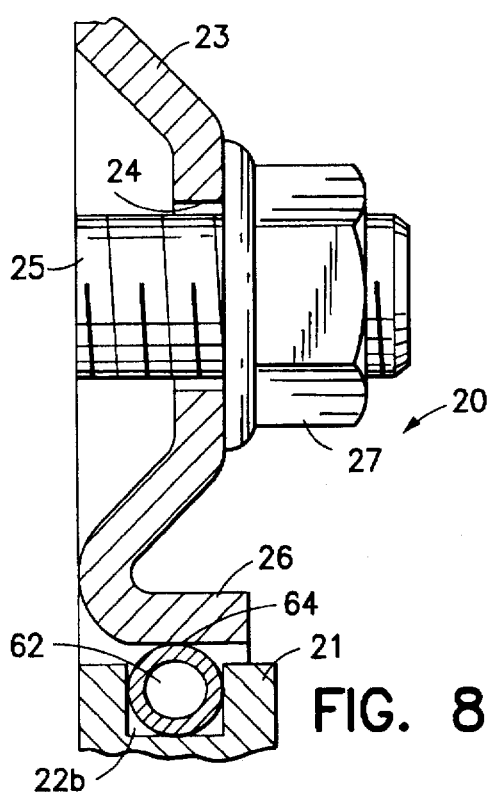
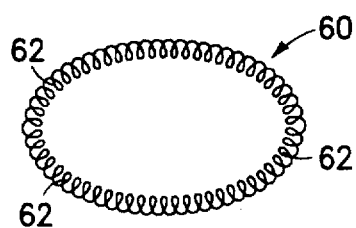
FIG. 7
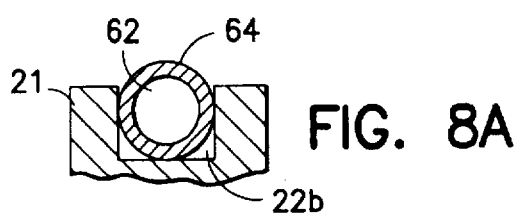
FIG. 8    FIG. 8A
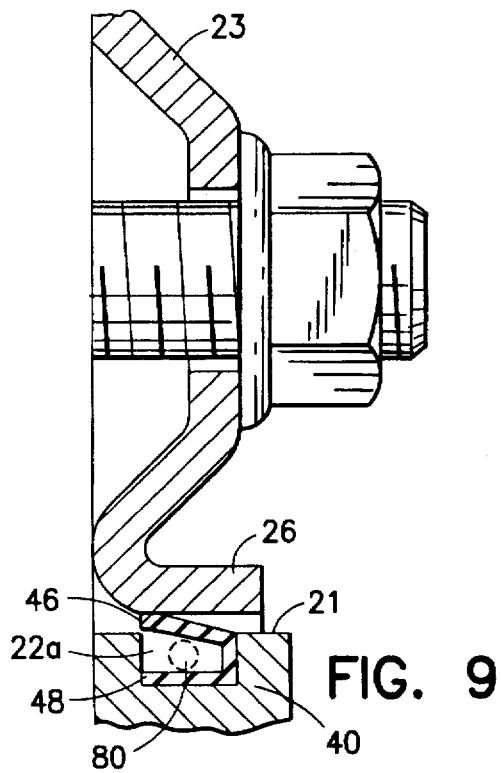
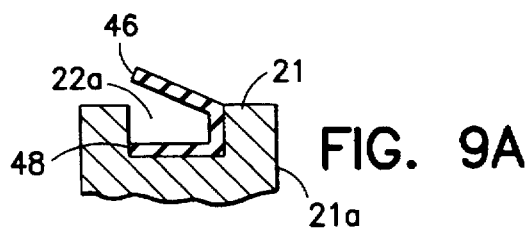
FIG. 9    FIG. 9A

APPARATUS FOR CENTERING A WHEEL ON A HUB

This application is a continuation of application Ser. No. 08/523,901, filed Sep. 6, 1995 which is a continuation of application Ser. No 08/305,735 filed Dec. 7, 1994, which is a continuation of application Ser. No. 08/224,134 filed Apr. 6, 1994, which is a continuation of application Ser. No. 08/009,895 filed Jan. 27, 1993 all abandoned.

FIELD OF THE INVENTION

The present invention relates to an improved apparatus for centering a wheel on a hub.

BACKGROUND OF THE INVENTION

Accurate centering of detachable vehicular wheels on hubs is an important consideration, for purposes of reducing runout, enhancing a vehicle's handling performance and also for safety.

Prior art centering apparatus include providing in the wheel a center hole that fits over a hub pilot boss. This arrangement has the disadvantage that if the diametrical clearance between the wheel center and the hub pilot boss is too small, it is difficult to remove the wheel for reasons including the effects of corrosion. If the diametrical clearance is too large, imbalance and out-of-round occur due to the wheel being off-center. Precise centering in the above-described arrangement requires reducing manufacturing tolerances to levels that may be unacceptable from a cost point of view, or that may be difficult to obtain on a large-scale production basis.

Another common prior-art arrangement for centering wheels involves mounting holes in the disc portion of the wheel with a ball chamfer or cone chamfer in order to center the wheel on studs. However, the centering resulting from such an arrangement is not always acceptable due to the location, skewness and tolerances of the holes, studs and chamfers.

A further prior art apparatus is disclosed in U.S. Pat. No. 4,699,431 to Daberkoe. Daberkoe discloses a series of chambers spaced generally equally about the circumference of a pilot boss of the hub. Located and captured within each chamber is a pilot ball. The Daberkoe patent notes that 5–7 balls be used. Each ball is urged outwardly under pressure exerted by a resilient elastic sleeve that is installed in a central cavity of the pilot boss of the hub. The elastic sleeve is retained within the cavity wall by a properly sized retaining annulus of steel or other rigid material. As the wheel is mounted over the pilot boss of the hub, a pilot flange of the wheel interferingly engages the series of pilot balls and the balls deflect inwardly against the elastic sleeve. The Daberkoe patent states that this arrangement substantially centers a wheel/tire assembly on the axis of the hub. The Daberkoe patent also suggests use of a spring member backed against the pilot balls in place of the elastic sleeve.

One disadvantage of the Daberkoe multi-piece centering apparatus is its complexity, with the resulting increased cost and space requirements. Further, the Daberkoe apparatus would be difficult to install, maintain and service, due to its multi-piece construction. Daberkoe also requires a central cavity in the pilot boss to allow for the insertion of the deflectable balls from within the boss and the subsequent insertion of the resilient backing and the retaining steel annulus to hold the balls in place.

Accordingly, there remains a need for a simplified, inexpensive, and easy to install centering apparatus for accurately centering a wheel on a hub.

SUMMARY OF THE INVENTION

The present invention relates to an apparatus for centering a wheel with a central opening on a hub, whereby a one-piece centering apparatus, which is positioned about the circumference of the hub pilot boss, is retained at either the pilot boss or the flange defining the wheel central opening. The centering apparatus engages either the flange or the pilot boss by bendable resilient means in a press fit to center the wheel on the hub pilot boss.

In one preferred embodiment, the centering apparatus is in the shape of a metal ring having bendable resilient members or fingers extending outwardly from the ring at an angle to the plane of the ring. The ring is retained in an annular groove of the hub pilot boss by means of a snap fit, with the fingers extending in a direction away from the end of the hub pilot boss. As the somewhat loosely-fitting wheel is mounted over the hub, the flange or other marginal circular edge defining the central opening of the wheel interferingly presses against the fingers of the ring. The resilient fingers accordingly bend in order to compensate for the interference fit. The resulting press fit between the flange of the wheel and the fingers of the centering ring maintains proper centering of the wheel on the hub, with the fingers having sufficient strength to sustain the weight of the wheel while accurately centering it on the hub even while the wheel is in a vertical position and not yet bolted or otherwise fixed to the hub.

Additional preferred embodiments of the present invention vary the cross-sectional shape and/or materials of the one-piece centering apparatus with its interfering members. The centering apparatus may be formed of elastomeric material. The centering apparatus also may have a cross-section in the approximate shape of a "V", "U", "N", or "M", lying on its side, one leg of which comprises the bendable resilient member or finger. Further, the centering apparatus may be formed of a coiled wire in the shape of a toroid placed in the annular groove, a portion of the coils of which also form the bendable resilient members. Still further embodiments include retaining the centering apparatus in the wheel disc rather than at the hub pilot boss, the bendable resilient fingers then engaging the hub pilot boss and bending in press fit to achieve the centering; replacing the resilient fingers with a continuous bendable resilient member to carry out the same function; and, having the centering apparatus extend discontinuously about the circumference of the hub pilot boss.

Among other objects and advantages, the present invention requires only one additional part, provides better centering between the hub and the wheel, reduces corrosion therebetween, allows for looser manufacturing tolerances, takes little additional space, is economical, and is simple in construction and assembly.

BRIEF DESCRIPTION OF THE DRAWINGS

FIG. 1 is a perspective view of a first embodiment of a centering apparatus of the present invention;

FIG. 2 is a bottom plan view of the centering apparatus of FIG. 1;

FIG. 3 is a front elevational view of the centering apparatus of FIG. 1;

FIG. 4 is a fragmentary, partial sectional view of a wheel and hub assembly incorporating the centering apparatus of FIGS. 1–3;

FIG. 4A is a fragmentary sectional view showing the centering apparatus of FIGS. 1–3 mounted in a groove in a hub, wherein a wheel has not yet been mounted to the hub;

FIG. 7 is a perspective view of a further embodiment of a centering apparatus of the present invention;

FIG. 8 is a fragmentary, partial sectional view of a wheel and hub assembly incorporating the centering apparatus of FIG. 7;

FIG. 8A is a fragmentary sectional view showing the centering apparatus of FIG. 7 mounted in a groove in a hub, wherein a wheel has not yet been mounted to the hub;

FIG. 9 is a fragmentary, partial sectional view of a wheel and hub assembly incorporating a further embodiment of a centering apparatus of the present invention;

FIG. 9A is a fragmentary sectional view showing the centering apparatus of FIG. 9 mounted in a groove in a hub, wherein a wheel has not yet been mounted to the hub;

DETAILED DESCRIPTION OF EMBODIMENTS

Figure 5:
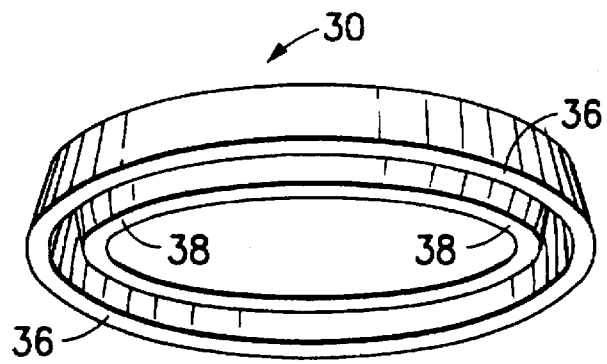
FIG. 5 is a perspective view of a further embodiment of a centering apparatus of the present invention.

A first embodiment of a centering apparatus 10 of the present invention is shown in FIGS. 1–3. The apparatus 10 is preferably made of a stiff material that can bend, such as spring steel. The apparatus 10 has a split ring configuration, with a ring portion 12 having a slot 14 at a location on its circumference. Integral with and extending outwardly from ring portion 12 about its circumference, at an angle to the plane of the ring, are bendable resilient members designated as fingers 16, which, as explained below in reference to the discussion of FIG. 4, act to maintain the centering of a wheel on a wheel-carrying hub.

FIG. 4 shows in partial, fragmented longitudinal cross-section a wheel and hub assembly 20 that utilizes the centering apparatus 10 of FIGS. 1–3. The wheel and hub assembly is intended for use in motor vehicles, and the hub may be secured to the motor vehicle in any number of known ways. A wheel-carrying hub with cylindrical hub pilot boss 21 has an annular groove 22 around its circumference. The depth D2 of the groove 22 approximately equals the distance D1 between the inner and outer radii of the ring portion 12 of the centering apparatus 10 (FIG. 1). The one-piece centering apparatus 10, shown in longitudinal cross-section, is stretched over the hub pilot boss 21 and is snapped into the annular groove 22, with the resilient fingers 16 extending away from the end 21a of the hub pilot boss 21. The configuration of the annular groove 22, in relation to the configuration of the ring portion 12, is such that the centering apparatus is placed in a snap-fit relation in the groove 22.

The wheel 23 has oversized apertures 24 through which threaded bolts 25 are used to bolt the wheel 23 to the hub and associated structure in a conventional manner. The wheel 23 has cylindrical central opening flange 26 (or other non-flanged marginal circular edge defining the wheel central opening) which, when the wheel 23 is mounted on the hub pilot boss 21, engages with the centering apparatus 10 in a press fit manner so as to maintain the centering of the wheel 23.

The wheel assembly 20 is assembled as follows. First, as noted above the centering apparatus 10 is stretched over the hub pilot boss 21 and snapped into the annular groove 22 in the hub pilot boss 21. The ring portion 12 of the apparatus 10 is retained in the groove 22. The slot 14 eases the mounting of the centering apparatus 10 into the annular groove 22. Next, the wheel 23 is placed over the hub pilot boss 21. Central opening flange 26 of wheel 23 interferingly presses inwardly against the resilient fingers 16 of centering apparatus 10, as shown in FIG. 4. The fingers 16 accordingly resiliently bend inwardly to compensate for the interference fit.

FIG. 4A shows the centering apparatus 10 secured in groove 22, with the wheel not yet mounted to the hub pilot boss 21. It is readily seen that the fingers 16 are biased at a different angle relative to the ring portion 12. A comparison of FIGS. 4 and 4A demonstrates how the central opening flange 26 of the wheel 23 causes the fingers 16 of the centering apparatus 10 to resiliently bend in press fit relation with the flange when the wheel 23 is mounted to the hub pilot boss 21.

Referring back to FIG. 4, the spring action of the fingers 16 keeps the wheel 23 centered on the hub pilot boss 21, thereby allowing for a loose tolerance between the wheel flange 26 and hub pilot boss 21, and between the retaining bolts 25 and the apertures 24 in the wheel 23. Therefore, precise machining of the relative parts is not required, thus reducing cost and complexity. Further, corrosion is reduced and disassembly accordingly is simplified.

It will be understood that fingers 16 are appropriately dimensioned and of appropriate resilient strength to maintain the wheel 23 centered in vertical position, although not yet bolted to the hub. The wheel 23 is then bolted to the hub in a conventional manner utilizing bolts 25 and non-centering nuts 27, and the wheel central opening flange 26 will not contact the hub pilot boss 21.

The centering apparatus 10 has numerous advantages over the arrangement of the Daberkoe patent. For example, the centering apparatus 10 shown in FIGS. 1–4 is one piece, versus the Daberkoe multi-piece arrangement (for example, balls 52, elastic sleeve 56 and retaining steel annulus 58 shown in FIG. 1 of Daberkoe). The present invention therefore reduces the cost and complexity of a centering apparatus. The centering apparatus of FIGS. 1–4 also takes up less space and weighs less than the Daberkoe structure, and is easier to install and repair. Installation of the apparatus 10 is accomplished quickly and easily by placing the apparatus 10 over the hub 21 and then snapping the centering apparatus 10 into the annular groove 22. By contrast, the preferred embodiment of the Daberkoe structure calls for a series of balls (preferably, 5–7) and chambers in the hub, as well as an elastic sleeve or other resilient backing means. Further, better centering is obtained with the centering apparatus 10 of the present invention because of the use of fewer parts, compared to the Daberoe structure. The centering device 10 has similar advantages over the alternative Daberkoe structure that utilizes the series of balls and a backing spring member in place of the elastic sleeve.

Figures 6, 6A:
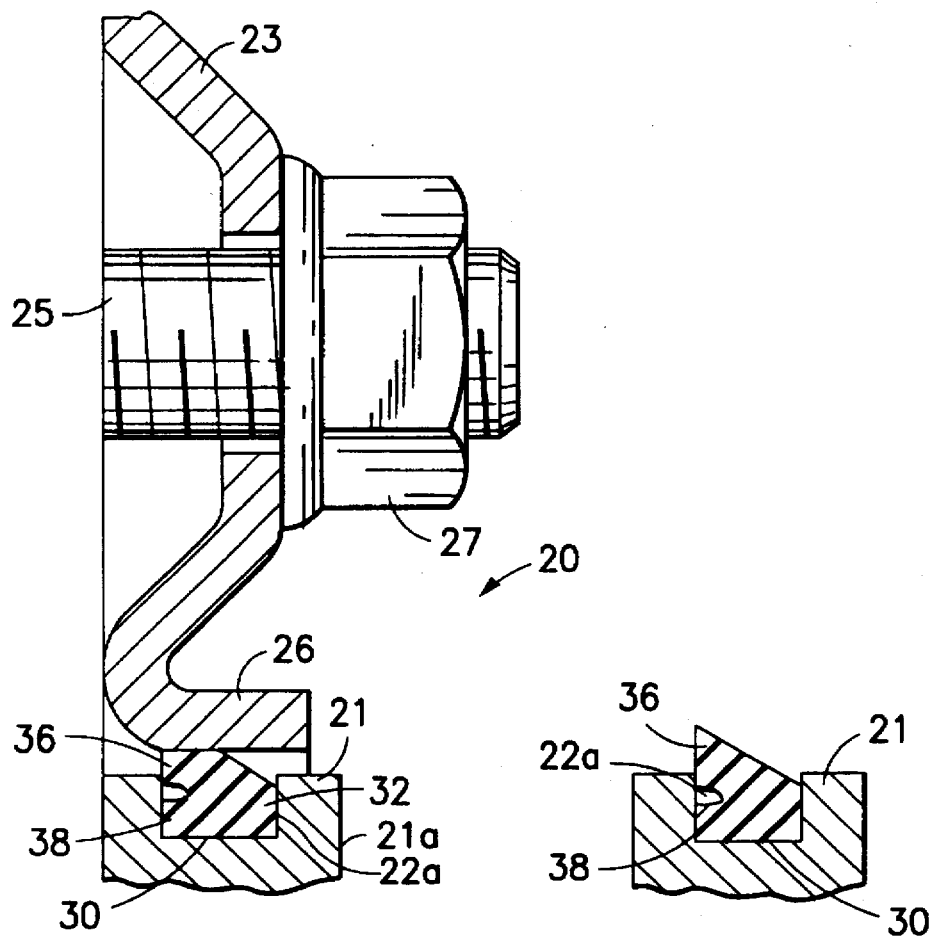
FIG. 6 is a fragmentary, partial sectional view of a wheel and hub assembly incorporating the centering apparatus of FIG. 5.
FIG. 6A is a fragmentary sectional view showing the centering apparatus of FIG. 5 mounted in a groove in a hub, wherein a wheel has not yet been mounted to the hub.

FIGS. 5–6 show a second embodiment of a one-piece centering apparatus 30 of the present invention. The centering apparatus 30 is preferable made of a stiff elastomeric material such as plastic or rubber that has a certain amount of "give". The apparatus 30 performs the same function as the apparatus 10 of FIGS. 1–4, and has an approximate "V" shape (lying on its side in FIG. 6) in cross section with resilient and bendable members (legs) 36 and 38. Members 36 extend outwardly toward wheel central opening flange 26, and away from the end 21a of hub pilot boss 21, in a manner similar to fingers 16 of the centering device 10 of FIGS. 1–4. Either or both series of legs 36 and 38 may be a continuous member extending around the circumference of the apparatus 30 as shown in FIG. 5, or may be interrupted into separate fingers corresponding to fingers 16 of FIGS. 1–4.

The hub cylindrical pilot boss 21 in FIG. 6 has an annular groove 22a that is configured to receive the centering apparatus 30 in a snap-fit relation. The centering apparatus 30 is placed over the hub pilot boss 21 and, as in the FIG. 4 embodiment, is then snapped into place in the annular groove 22a in the hub pilot boss 21. As the wheel 23 is placed on hub pilot boss 21, the central opening flange 26 of wheel 23 interferingly presses against, to resiliently bend, the series of members 36 of centering apparatus 30, thereby forming a press fit that maintains the centering of the wheel 23 on the hub pilot boss 21. The wheel 23 is secured to the hub 21 by means of bolts 25 and nuts 27, as previously described in relation to the FIG. 4 embodiment.

FIG. 6A shows the centering apparatus 30 mounted in the groove 22a of the hub pilot boss 21, but without the wheel 23 mounted to the hub. The resilient bending of legs 36 is readily apparent in FIG. 6.

The centering apparatus 30 shown in FIGS. 5–6 may be better able to center heavier wheels than the centering apparatus of FIGS. 1–4 due to the higher spring rating of the centering apparatus 30. Also, since the centering apparatus 30 is made of plastic or rubber, and not steel, the apparatus 30 will not corrode and will not scratch the hub pilot boss 21 or wheel 23 (and/or coatings thereon) and thereby potentially cause corrosion of the wheel. However, the centering apparatus 10 of FIGS. 1–4 has the advantages, compared to the centering apparatus 30 of FIGS. 5–6, of less space, lower cost, ease of assembly/disassembly, low friction between the wheel and centering apparatus, wider operating temperature range, and negligible water absorption.

FIGS. 9, 9A and 10, 10A show variations of the centering apparatus 30 cross-section, but with the configuration, assembly and functioning otherwise corresponding to that of FIGS. 6 and 6A. The FIGS. 9, 9A centering apparatus (element 40), shown in approximate "U" shape (lying on its side) in longitudinal cross-section, is similar, to the FIGS. 5–6 element 30, except that the resilient and bendable legs (fingers) 46 and 48 of the apparatus 40 are thinner than the legs 36 and 38.

Figure 10:
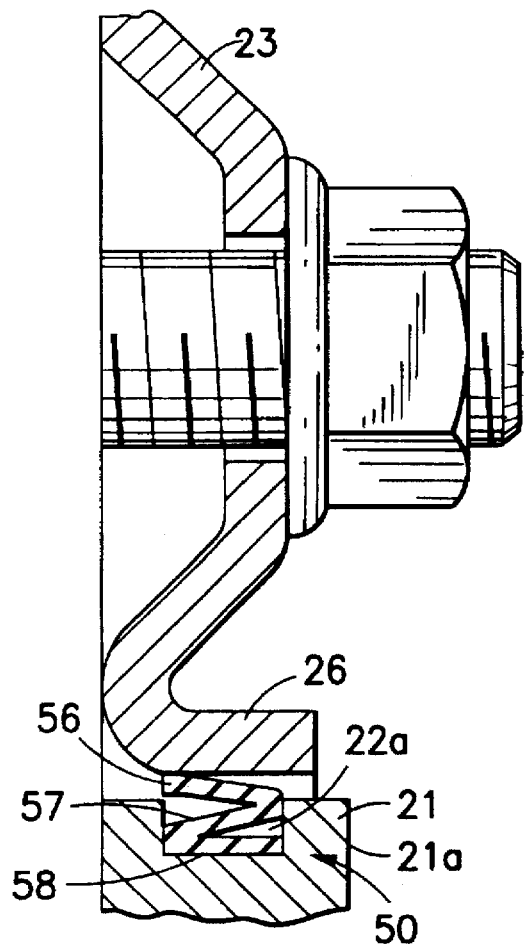
FIG. 10 is a fragmentary, partial sectional view of a wheel and hub assembly incorporating a further embodiment of a centering apparatus of the present invention.
Figure 10A:
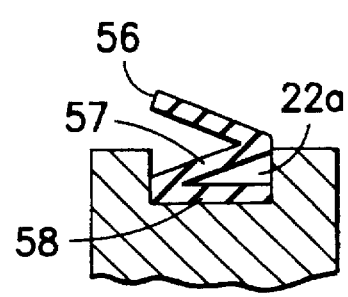
FIG. 10A is a fragmentary sectional view showing the centering apparatus of FIG. 10 mounted in a groove in a hub, wherein a wheel has not yet been mounted to the hub.

The FIGS. 10, 10A centering apparatus (element 50) has an approximate longitudinal cross-section in the shape of an "N" (lying on its side), with elements 56 and 58 representing the resilient and bendable outer legs (fingers) of the "N" and number 57 representing the middle leg. Alternately, a corresponding centering apparatus may be used with an approximate longitudinal cross-section in the shape of an "M" (lying on its side), one of the outer legs of the "M" extending in the direction from right to left in the manner of leg 56 of FIGS. 10 and 10A.

The centering apparatus 40 and 50 also are preferably made of a stiff elastomeric material with a certain amount of "give". It will be further understood that members 36,46 and 56 are appropriately dimensioned and of appropriate resilient strength to maintain the wheel 23 centered in vertical position before being bolted to the hub. Again, the legs may be a continuous member extending around the circumference of the apparatus 40 or 50, as in FIG. 5, or may be interrupted into separate fingers corresponding to fingers 16 of FIGS. 1–4. The embodiments of FIGS. 5,6,6A,9,9A,10 and 10A may be split (corresponding to 14 in FIG. 1) and wrapped around the hub pilot boss, or may be molded as a continuous ring as shown in FIG. 5.

FIGS. 7, 8 and 8A show a still further embodiment of a centering apparatus 60 of the present invention. The apparatus 60 consists of a coiled wire of spring steel formed in the shape of a toroid having a plurality of loops or coils 62. In effect, apparatus 60 is essentially an extension spring having both ends joined together. The apparatus 60 snap-fits into annular groove 22b around the outer circumference of hub pilot boss 21 as in prior embodiments. Because centering apparatus 60 is a spring, apparatus 60 is easy to snap into place in groove 22b. As the wheel 23 is pressed over the hub pilot boss 21, the wheel central opening flange 26 engages in a press fit with a portion 64 of the circumference of each loop or coil 62, thereby maintaining the centering of the wheel on the hub. Portions 64 of each loop serve as bendable resilient members, as will be noted by a comparison of FIG. 8 (wheel mounted) and FIG. 8A (wheel unmounted). As in prior embodiments, bolts 25 and nuts 27, in conjunction with oversized aperture 24, act to secure the wheel to the hub. The centering apparatus 60 is easy to mount in the hub, is economical, and can be used for different hub diameters due to the fact that the apparatus 60 is essentially a spring. Further, centering apparatus 60 has a wide temperature range, a high spring rate to center heavy wheels, and presents no problem of water absorption. The centering apparatus 60, being a spring, also can roll in its groove 22b, which facilitates mounting the wheel central opening flange 26 on the hub pilot boss 21.

Figure 11:
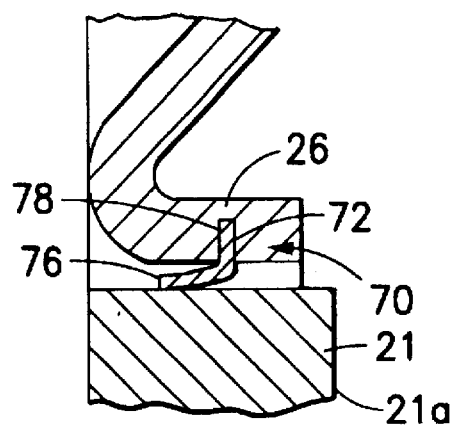
FIG. 11 is a fragmentary, partial sectional view of a wheel and hub assembly incorporating a further embodiment of a centering apparatus of the present invention.

It should be understood that the centering apparatus of the present invention may be placed on the wheel flange (or other marginal circular edge) instead of in a groove in the hub. See, for example, the one-piece centering apparatus in FIG. 11, a view corresponding to FIG. 4 except that spring steel ring 72 is inserted into annular groove 78 extending around the circumference of the flange 26. Separate bendable resilient spring steel fingers 76 engage in press fit relation with the circumference of hub pilot boss 21 to achieve the desired centering. Similarly, the embodiments of FIGS. 5–10 could also be retained at the wheel flange rather than at the hub pilot boss, the bendable resilient members functioning in the same manner to engage in press fit relation with the circumference of the hub pilot boss 21 to achieve centering. Further, the centering apparatus of the present invention may be retained on the hub pilot boss or wheel flange by a retaining ring, washer or other retaining means, or may be molded onto the hub pilot boss or wheel marginal circular edge, rather than requiring use of a groove. Additionally, centering apparatus having cross-sections different from those discussed above may be utilized in practicing the invention. Still further, the centering apparatus may occupy discrete segments rather than the entire circumference about the hub pilot boss. Also, in situations where added stiffness may be desired, an O-ring can be added, for example as shown in dotted line as element 80 in FIG. 9 positioned between legs 46 and 48. Or, the spring means of FIG. 7 could be inserted between legs 46 and 48 in place of the O-ring. Other configurations, combinations and/or modifications may be made in the present invention without departing from the spirit and scope of the invention as hereafter claimed.

What is claimed is:

1. Apparatus for centering a wheel with a central opening, defined by a marginal circular edge, on a hub having a pilot boss with an outer end, said pilot boss being diametrically smaller than the central opening and there being a space between the marginal circular edge and the circumference of the pilot boss when the wheel is centered on the hub, comprising:

centering apparatus positioned about the circumference of the hub pilot boss and occupying at least in part the space between the hub pilot boss and the marginal circular edge when the wheel is centered on the hub;

retaining means positioned about one of the hub pilot boss and marginal circular edge for retaining the centering apparatus in a fixed position to one of the hub pilot boss and marginal circular edge;

said centering apparatus comprising first means retained by the retaining means and second bendable resilient means extending into the space between the marginal circular edge and the circumference of the hub pilot boss to engage and bend in press relation with one of the marginal circular edge and the circumference of the hub pilot boss when the wheel is mounted on the hub pilot boss, whereby the press fit maintains the centering of the wheel on the hub pilot boss.

2. The invention of claim 1, wherein the centering apparatus is retained at the hub pilot boss and the second bendable resilient means engages and bends in press fit relation with the marginal circular edge.

3. The invention of claim 1, wherein the centering apparatus is retained at the marginal circular edge and the second bendable resilient means engages and bends in press fit relation with the hub pilot boss.

4. The invention of claim 2 or claim 3, wherein said centering apparatus in longitudinal cross-section is of one-piece construction from the axis of the pilot boss radially outward.

5. The invention of claim 2 or claim 3, wherein the centering apparatus extends continuously about the circumference of the hub pilot boss.

6. The invention of claim 2 or claim 3, wherein the centering apparatus extends discontinuously about the circumference of the hub pilot boss.

7. The invention of claim 2, wherein the second bendable resilient means comprises a plurality of fingers extending outwardly of the pilot boss.

8. The invention of claim 3, wherein the second bendable resilient means comprises a plurality of fingers extending inwardly of the marginal circular edge.

9. The invention of claim 7 or claim 8, wherein the plurality of fingers extend at an angle away from the outer end of the pilot boss.

10. The invention of claim 2 or claim 3, wherein the second bendable resilient means comprises portions of the coils of a spring.

11. The invention of claim 2 or claim 3, wherein the second bendable resilient means comprises a continuous member.

12. The invention of claim 2 or claim 3, wherein the first means of the centering apparatus is integral with the second bendable resilient means of the centering apparatus.

13. The invention of claim 2, wherein the retaining means comprises a groove in the outer circumference of the hub pilot boss, the first means of the centering apparatus being retained therein.

14. The invention of claim 13, wherein the groove annularly extends around the outer circumference of the hub pilot boss.

15. The invention of claim 3, wherein the retaining means comprises a groove in the marginal circular edge, the first means of the centering apparatus being retained therein.

16. The invention of claim 15, wherein the groove annularly extends around the marginal circular edge.

17. The invention of claim 2 or claim 3, wherein the marginal circular edge defining the wheel central opening is a flange.

18. The invention of claim 2 or claim 3, wherein the centering apparatus is made of spring steel.

19. The invention of claim 2 or claim 3, wherein the centering apparatus is made of an elastomeric material.

20. The invention of claim 2 or claim 3, wherein the centering apparatus comprises a coiled wire in the shape of a toroid.

21. The invention of claim 2 or claim 3, wherein said centering apparatus in longitudinal cross-section is of one-piece construction from the axis of the pilot boss radially outward and has the approximate shape of an "N", "M", "U" or "V" lying on its side, one leg of which comprises the second bendable resilient means of the centering apparatus.

22. The invention of claim 2 or claim 3, wherein said centering apparatus in longitudinal cross-section has the approximate shape of a "U" lying on its side, and an O-ring further being positioned between the legs of the "U".

23. The invention of claim 2 or claim 3, wherein said centering apparatus in longitudinal cross-section has the approximate shape of a "U" lying on its side, and spring means further being positioned between the legs of the "U".

* * * * *